United States Patent [19]
Young

[11] 3,868,176
[45] Feb. 25, 1975

[54] POWERED ADJUSTABLE REAR VIEW MIRROR FOR A TRUCK TRAILER

[76] Inventor: David E. Young, Rt. 2, Box 133, South Point, Ohio 45680

[22] Filed: Dec. 5, 1973

[21] Appl. No.: 421,768

[52] U.S. Cl. ............... 350/289, 350/299, 350/302
[51] Int. Cl. ............................................. G02b 5/08
[58] Field of Search .......... 350/289, 302, 307, 299, 350/288, 301

[56] References Cited
UNITED STATES PATENTS

| | | | |
|---|---|---|---|
| 2,871,761 | 2/1959 | Snyder | 350/289 |
| 2,988,957 | 6/1961 | Kotora | 350/289 UX |
| 3,208,343 | 9/1965 | Prochnow | 350/302 |
| 3,741,633 | 6/1973 | Haley | 350/302 |

FOREIGN PATENTS OR APPLICATIONS

| | | | |
|---|---|---|---|
| 1,538,484 | 7/1968 | France | 350/302 |

*Primary Examiner*—Gerard R. Strecker

[57] ABSTRACT

A truck mirror intended to be attached to the front end of a trailer unit behind a tractor pulling the same with the mirror being remotely controllable by the driver from inside of the tractor cab in a manner to rotate the mirror from an inoperative storage position to an operative projected position so that the driver may readily see to the rear of the trailer when backing the same into a loading dock or the like without any necessity for an additional person to guide the driver into the proper dock location.

1 Claim, 5 Drawing Figures

PATENTED FEB 25 1975　　　　　　　　　　　　3,868,176
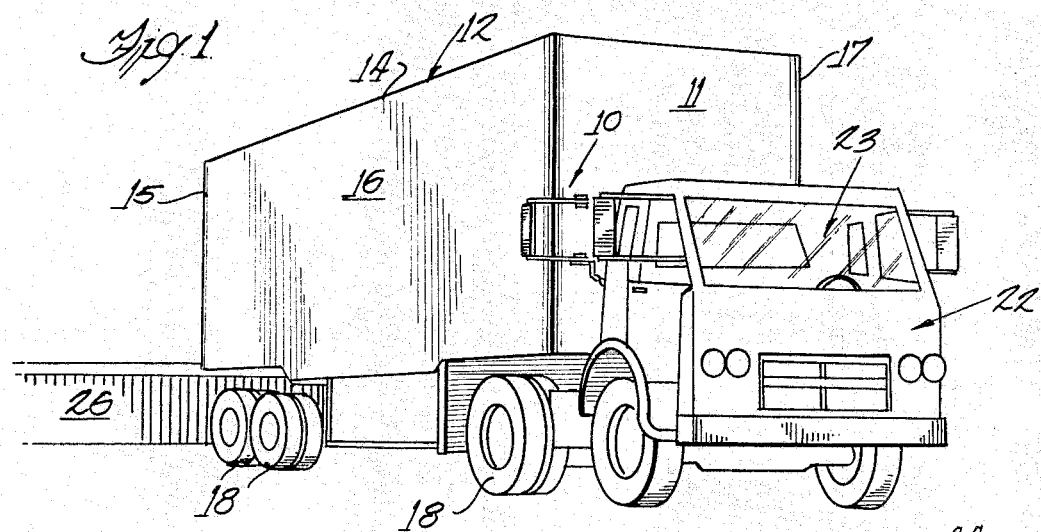
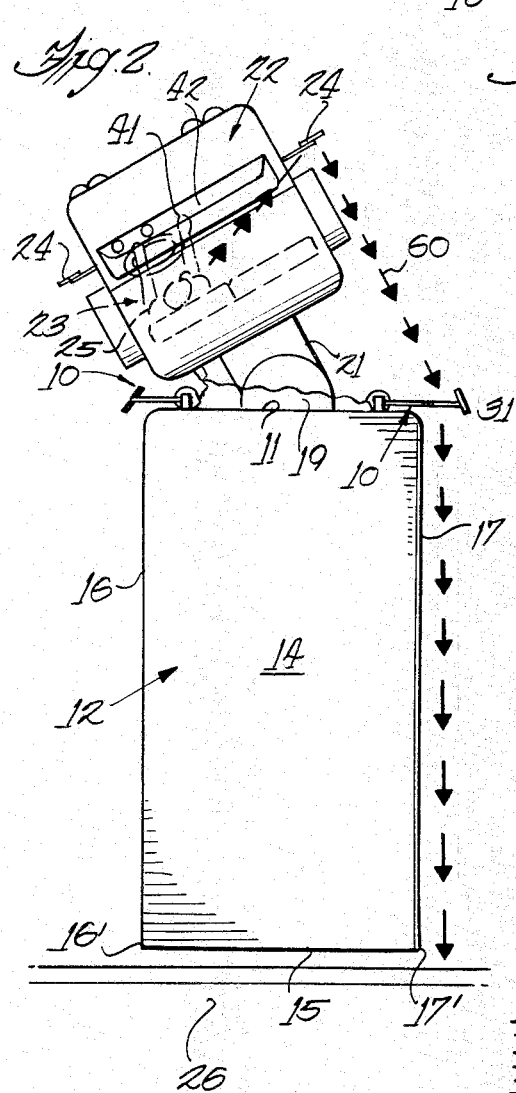
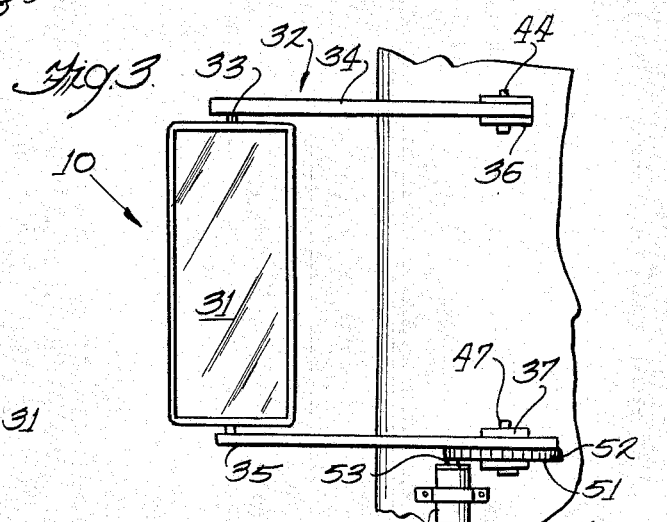
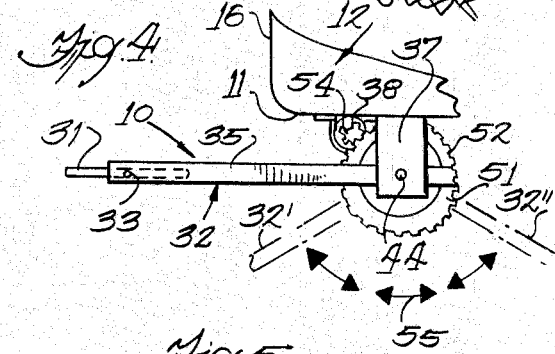
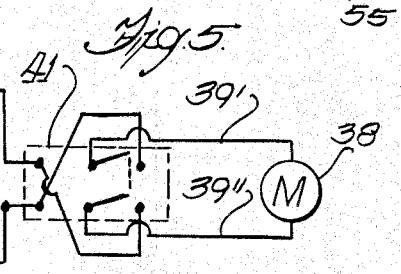

POWERED ADJUSTABLE REAR VIEW MIRROR FOR A TRUCK TRAILER

BACKGROUND OF THE INVENTION

1. Field of the Invention

This invention relates generally to rear view mirrors for trucks, trailers, semi-trailers and the like and more particularly to a novel and improved rear view mirror intended to be mounted to the front end of a trailer and remotely controllable between a storage position and a projecting operative position to provide visibility to the driver to the rear of the trailer body.

2. Description of the Prior Art

As is well known in the fields relating to trailers and tractor units which pull the same, such assemblies commonly referred to as semi-trailers and the like, such trailers have very wide bodies such that when backing the trailer up it is necessary for the tractor to be disposed at an angle to the trailer, such angle preventing the driver from viewing the far side of the tractor body so as to be unable to see rearwardly of the tractor body at the far side thereof. Thus, it is normally required that an additional person be present to guide the driver, or alternatively, it is normally required that the driver leave the tractor cab and inspect the far side of the trailer body as to clearance and the like during several stages of the backing up process in order to assure that the far side of the trailer body does not encounter any other trailers, posts, or the like when the driver is backing the trailer into a loading dock or the like for loading or unloading purposes.

While rear view mirrors are known for use with trucks, trailers and the like in a manner mounted on the tractor cab and projecting a great distance outwardly therefrom in order to clear the wide body of the tractor and provide an unobstructed view of the roadway to the rear of the trailer body when the tractor is pulling the same, such mirrors are not effective when the tractor is at an angle to the trailer as far as the seeing of the rear of the far side of the trailer body is concerned.

SUMMARY OF THE INVENTION

The present invention recognizes the problem of tractor trailer drivers as to lack of visibility of the far side of the trailer and the far side rear end thereof when backing the trailer, and provides a novel solution thereto in the form of a remotely controllable rear view mirror unit adapted to be mounted to the front end of the trailer body and remotely controllable from the cab of the tractor by the driver between an inoperative position disposed generally inwardly of the trailer body and operative position projecting outwardly from the side of the trailer body such that the driver may see through the mirror along the far side of the trailer body to see the far rear end portion of the trailer body. The operative position may be remotely selected by the driver from the tractor cab to provide the desired line of vision along the tractor body side as the position of the tractor cab varies relative to the position of the trailer body as the trailer is backed rearwardly into a loading dock or the like.

It is a feature of the present invention to provide a remotely controlled truck rear view mirror which may be remotely aimed by the driver while seated in the tractor cab with such remote controlled aiming being achieved by means of a reversable motor rotating the bracket supporting the mirror under the control of the seated tractor driver.

A further feature of the present invention provides a remotely controllable rear view mirror adapted to be mounted on the front end of a trailer body to provide a reflected line of vision for the driver to see along the far side of the trailer body to the rear end thereof while backing the trailer into or pulling the trailer from a loading dock or the like.

Still a further feature of the present invention is the provision of a rear vision truck mirror which is relatively simple in its construction and which therefore may be readily manufactured at a relatively low cost and by simple manufacturing methods.

Still a further feature of the present invention is the provision of a remote controllable rear view vision truck mirror which is easy to use and efficient in operation.

Yet still a further feature of the present invention provides a remote controllable rear view vision truck mirror which may be manufactured and installed as part of the original equipment of the trailer, or which may be readily attached to the trailer later as an accessory item.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a prespective view of a tractor cab attached to a semi-trailer having a pair of mirrors constructed in accordance with the present invention mounted thereon;

FIG. 2 is a top plan view of the tractor cab and semi-trailer in position backing into a dock with the trailer mirror in the operative position;

FIG. 3 is an enlarged fragmentary elevational view of the front end of the semi-trailer having a remote controllable mirror mounted thereon;

FIG. 4 is a top plan view of FIG. 3; and

FIG. 5 is an electrical schematic view of the electrical circuit for controlling the mirror unit.

DESCRIPTION OF THE PREFERRED EMBODIMENT

Referring now to the drawings in detail there is illustrated a preferred form of a remotely controlled rear view vision truck mirror which is constructed in accordance with the principles of the present invention and designated in its entirety by the reference numeral 10. For purposes of illustration a pair of mirror units 10 are shown mounted at the opposite sides of the front end 11 of a semi-trailer 12 having a top surface 14, a back end 15, opposed vertical side wall surfaces 16 and 17, and supporting wheels 18. The trailer 12 is provided at the front end with a conventional hitch 19 which is pivotally connected to a conventional hitch 21 projecting rearwardly from a tractor cab 22 including a conventional driver compartment 23 and which is provided with a pair of outboard rear vision mirrors 24 projecting outwardly from each side of the cab in the conventional manner. As seen in FIGS. 1 and 2, a driver 25 is in the process of backing the semi-trailer 12 to loading dock 26. As noted, in this procedure of backing the trailer, the tractor cab 22 is disposed at an angle to the longitudinal axis of the trailer 12 such that while the driver can clearly see side 16 and back end portion 16' of the trailer, the driver is unable to see, either directly or through either mirror 24, the far side 17 and back end 17' of the trailer body.

As each of the mirror units 10 are identical to each other with their only differences being their positions of mounting on the trailer front end 11, only one of the mirror units has been shown in detail in FIGS. 3–5 with it being understood that the remaining mirror unit is identical thereto.

The mirror unit 10 comprises an elongated rectangularly shaped reflecting mirror 31, a U-shaped bracket 32 having a vertically disposed cylindrical solid rod defining a bright portion base 33 and a pair of vertically spaced apart horizontally extending legs 34 and 35, a pair of mounting brackets 36 and 37, and an electrically powered reversable electric motor 38 provided with suitable electrical wiring 39 adapted to be connected to a source of electrical power, such as a battery 40, with control of the motor being provided through a manually operable switch 41 which is preferably mounted on the dashboard 42 in the tractor cab driver compartment 23 for ease of reach and operation by driver 25 without having to leave his seated position.

The mirror 31 is of an elongated rectangular configuration and is pivotally connected along its longitudinal axis to the rod forming vertical base member 33 for pivotal movement about the axis thereof for hand adjustment of the mirror as will be later described. Each of the legs 34 and 35 project horizontally from opposed ends of base 33 with the opposite ends thereof being pivotally mounted in brackets 36 and 37 respectively by pivot pins 44. The brackets 36 and 37 are disposed in substantial vertical alignment and placed vertically apart when mounted on the front end 11 of trailer 12, the brackets being mounted thereto in any suitable manner such as by bolts or the like. Each of the brackets 36 and 37 are preferably of a U-shape with the legs of the U projecting outwardly from the base of the bracket to receive the associated ends of the arms 34 and 35 therebetween.

The end of leg 35 associated with bracket 37 is affixed diametrically to a spur gear 51 having gear teeth 52 disposed about the circumference thereof, the gear 51 and leg 35 being pivotally mounted to bracket 37 by pivot pin 44 in a manner providing rotative movement of the gear about its axis. The motor 38 is provided with a shaft 53 projecting out of one end thereof and having a gear 54 mounted thereon with the teeth of the gear in positive engagement with teeth 52 of gear 51 such that energization of the motor 38 will effect the rotation of the gear 51 about its axis in a manner to pivot the bracket 32 and attached mirror 31 between an inoperative position where the mirror is spaced inwardly of the sides 16 and 17 of the trailer 12, and to an operative position where the mirror 31 and bracket 32 projects outwardly of the sides of the trailer body. It is to be understood that in the inward inoperative position of the mirror unit 10 that the same is protected from road mud, stones, bugs and the like since the same is disposed on the trailer front end 11 in a position immediately rearwardly of the tractor cab 22, with the motor readily pivoting the mirror unit into the operative position, the movement of the bracket 32 being as designated by arrows 55 in FIG. 4 with the intermediate positions of the bracket 32 being designated in phantom configuration by reference numerals 32' and 32".

As seen in FIG. 5, the electrical wiring 39 supplying electrical energy to the motor 38 is in the form of a pair of suitable electrical wires designated 39' and 39" which, through use of the switch 41 which is of a double pole double throw type switch connects the motor 38 to the battery 40 in a manner providing for a polarity reversal of the flow of electrical energy through the motor in order to effect the reversal of the same in a known manner.

In operation, the orientation of the mirror 31 relative to the bracket 32 is adjusted by hand, such adjustment being permanently retained thereon until otherwise manually altered, after which all further adjustment of the bracket 32 relative to the trailer 12 is controlled by switch 41 by driver 25. Thus, as seen in FIG. 2, when backing the trailer the driver energizes the motor 38 in a manner to rotate the mirror unit 10 outwardly from its position adjacent front end 11 to a position where the mirror 31 is disposed in manner projecting outwardly from trailer side 17, the driver adjusting the angle of the bracket 32 relative to the trailer by use of the motor 38 until the driver is able to see along the side trailer side 17 to trailer back end 17', the driver's line of vision being as illustrated by arrows 60 in FIG. 2 as passing from the driver's eyes to outboard rear vision mirror 24 from whence it it reflected rearwardly to mirror 31 from whence it is again reflected rearwardly along the side 17 to the rear edge 17' of the back end 15 of the trailer.

The driver, through the use of the present invention, is thus able to back the trailer 12 while having complete visibility of the otherwise hidden far side of the trailer and back end edge of the trailer, this providing an increased safety factor to the backing of the trailer, this eliminating the need for an additional person to guide the drive to the proper location when aligning the truck with a dock for loading or unloading purposes, this eliminating the need for a driver to constantly leave the tractor cab to view the hidden far side of the trailer body during the backing process, and this otherwise eliminating frustration and aggravation to the driver while providing a time and labor saving device.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A truck mirror intended for attachment to the front end of a trailer body to provide rear view vision to a driver seated in a compartment of a tractor cab pulling the trailer so as to be able to see along the otherwise hidden side of the trailer to the back end of the trailer while backing the trailer and without having to leave the tractor cab, the truck mirror comprising:

a pair of vertically spaced apart brackets adapted to be mounted to the front end of a trailer body adjacent a side edge thereof, each bracket being of a U-shaped configuration having a flat base member adapted to be mounted to the front end wall of said trailer, and a pair of vertically spaced apart horizontally outwardly projecting arm portions;

a U-shaped supporting structure including a vertically disposed rod shaped bight forming base member and a pair of depending horizontally disposed leg members;

pivot means pivotally connecting the free terminal end of each leg member to an associated one of said brackets between said bracket arms for swinging movement relative thereto, each terminal end of each leg member being pivotally attached to said associated bracket intermediate said bracket arms by a vertically extending pivot pin interconnecting said arms and extending through a suitable opening in said terminal end of said associated leg member;

a mirror adjustably mounted to said base member for adjustable rotative movement thereabout;

a gear member having the terminal end portion of one of said legs diametrically secured in juxtaposition thereto for movement therewith, said gear pivotally mounted by said pivot means for rotative movement about its axis, said gear having gear teeth disposed about the peripheral circumference thereof;

an electrically powered direct current motor having a toothed gear wheel mounted concentric on the motor shaft with its teeth in driving engagement with the teeth of the first mentioned gear to effect the selective rotation of said gear in opposite directions about its axis to effect the simultaneous movement of the mirror support member between an inoperative storage position inwardly of the trailer front end and an operative position wherein the mirror projects outwardly of the associated side of the trailer;

electrical wiring means to interconnect said motor to a source of electrical energy;

switch control means in the form of a double pole double throw toggle actuated switch interposed intermediate said motor and said source of electrical energy and adapted to selectively control both the energization and de-energization of said motor as well as controlling the direction of rotation of said motor; and said source of electrical energy is in the form of a direct current battery such that the control switch effects the reversal of battery polarity as applied to the motor for controlling the reversing operations of the motor.

* * * * *